(12) United States Patent
Birkmann et al.

(10) Patent No.: US 12,477,967 B2
(45) Date of Patent: Nov. 25, 2025

(54) METHOD AND SYSTEM FOR REGULATING A REAR POWER LIFT OF AN AGRICULTURAL PRODUCTION MACHINE

(71) Applicant: CLAAS Tractor SAS, Vélizy-Villacoublay (FR)

(72) Inventors: Christian Birkmann, Versmold (DE); Christian Schaub, Paderborn (DE); Jona Pieper, Nordkirchen (DE)

(73) Assignee: CLAAS Tractor SAS, Vélizy-Villacoublay (FR)

( * ) Notice: Subject to any disclaimer, the term of this patent is extended or adjusted under 35 U.S.C. 154(b) by 599 days.

(21) Appl. No.: 17/880,900

(22) Filed: Aug. 4, 2022

(65) Prior Publication Data
US 2023/0047061 A1 Feb. 16, 2023

(30) Foreign Application Priority Data
Aug. 10, 2021 (DE) .......................... 102021120813.0

(51) Int. Cl.
*A01B 63/114* (2006.01)
*A01B 63/111* (2006.01)
*A01B 71/02* (2006.01)

(52) U.S. Cl.
CPC ......... *A01B 63/114* (2013.01); *A01B 63/1115* (2013.01); *A01B 71/02* (2013.01)

(58) Field of Classification Search
None
See application file for complete search history.

(56) References Cited

U.S. PATENT DOCUMENTS 6,041,582 A * 3/2000 Tiede .................. A01B 79/005
56/10.2 A
2010/0332071 A1* 12/2010 Kato .................. B60T 8/17554
701/31.4

(Continued)

FOREIGN PATENT DOCUMENTS

CN 108717261 A * 10/2018 ............. A01B 15/00
EP 2583543 A1 4/2013

(Continued)

OTHER PUBLICATIONS

European Search Report for European patent application No. 221 68327.9-1105 mailed Oct. 24, 2022.

*Primary Examiner* — Jelani A Smith
*Assistant Examiner* — Davin Seol
(74) *Attorney, Agent, or Firm* — Lempia Summerfield Katz LLC

(57) ABSTRACT

A method and system for regulating a rear power lift of an agricultural production machine in an agricultural combination is disclosed. The agricultural combination includes an agricultural production machine and an agricultural attachment. The agricultural attachment is connected to the agricultural production machine via a rear power lift of the agricultural production machine. The agricultural production machine includes a driver assistance system that regulates machine parameters of the rear power lift using position regulation and/or traction regulation on which a slip control is superimposed. The driver assistance system determines a target slip for slip regulation optimized for position regulation and/or traction regulation depending on at least one existing soil property and at least one existing tire property, and regulates the rear power lift to the optimized target slip.

20 Claims, 2 Drawing Sheets

(56) References Cited

U.S. PATENT DOCUMENTS

| | | | | |
|---|---|---|---|---|
| 2016/0159367 A1* | 6/2016 | Singh | ................... | B60T 8/1725 |
| | | | | 701/32.9 |
| 2016/0221446 A1* | 8/2016 | Suzuki | ................... | B60L 58/20 |
| 2017/0101103 A1* | 4/2017 | Foster | ................... | A01B 63/11 |
| 2017/0313318 A1 | 11/2017 | Heindl et al. | | |
| 2018/0084709 A1 | 3/2018 | Wieckhorst | | |
| 2019/0301143 A1* | 10/2019 | Miller | ................... | B60K 35/22 |
| 2019/0376920 A1* | 12/2019 | Puhalla | ............... | A01C 21/007 |

FOREIGN PATENT DOCUMENTS

| | | | | | |
|---|---|---|---|---|---|
| EP | 3305053 | A1 | | 4/2018 | |
| EP | 3342264 | A1 | * | 7/2018 | ........... A01B 63/111 |
| WO | 2016078782 | A1 | | 5/2016 | |

* cited by examiner

METHOD AND SYSTEM FOR REGULATING A REAR POWER LIFT OF AN AGRICULTURAL PRODUCTION MACHINE

CROSS REFERENCE TO RELATED APPLICATION

This application claims priority under 35 U.S.C. § 119 to German Patent Application No. 10 2021 120 813.0 filed Aug. 10, 2021, the entire disclosure of which is hereby incorporated by reference herein. This application is further related to: U.S. Utility application Ser. No. 17/880,917; U.S. Utility application Ser. No. 17/880,913; U.S. Utility application Ser. No. 17/880,909; U.S. Utility application Ser. No. 17/880,906; U.S. Utility application Ser. No. 17/880,904, each of which are incorporated by reference herein in their entirety.

TECHNICAL FIELD

The present invention relates to a method and system for regulating a rear power lift of an agricultural production machine.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Agricultural production machines such as combines, forage harvesters, and tractors may be combined with various attachments. These attachments may be attached via an equipment interface, such as a rear power lift, to the agricultural production machine. One combination may comprise an agricultural combinations of both the agricultural production machine and the agricultural attachment. The attachment may be connected via the rear power lift to the agricultural production machine.

Such attachments may serve to perform an agricultural job, such as soil cultivation (e.g., plowing or cultivating). Common to these types of soil cultivation is that the attachments are generally adjusted to a specific working depth. The success and the energy consumption of soil cultivation frequently depend largely on the working depth. At the same time, however, they may depend on various machine parameters of the attachment and the agricultural production machine, such as the rear power lift.

Typically, setting the rear power lift generally is performed manually by the user. He/she may specify a target position of the rear power lift relative to the tractor while regulating position, or may indirectly specify a target traction while regulating traction, or a mixed factor between a regulation of traction and position. Maximum permissible slip may also be specified when regulating slip.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
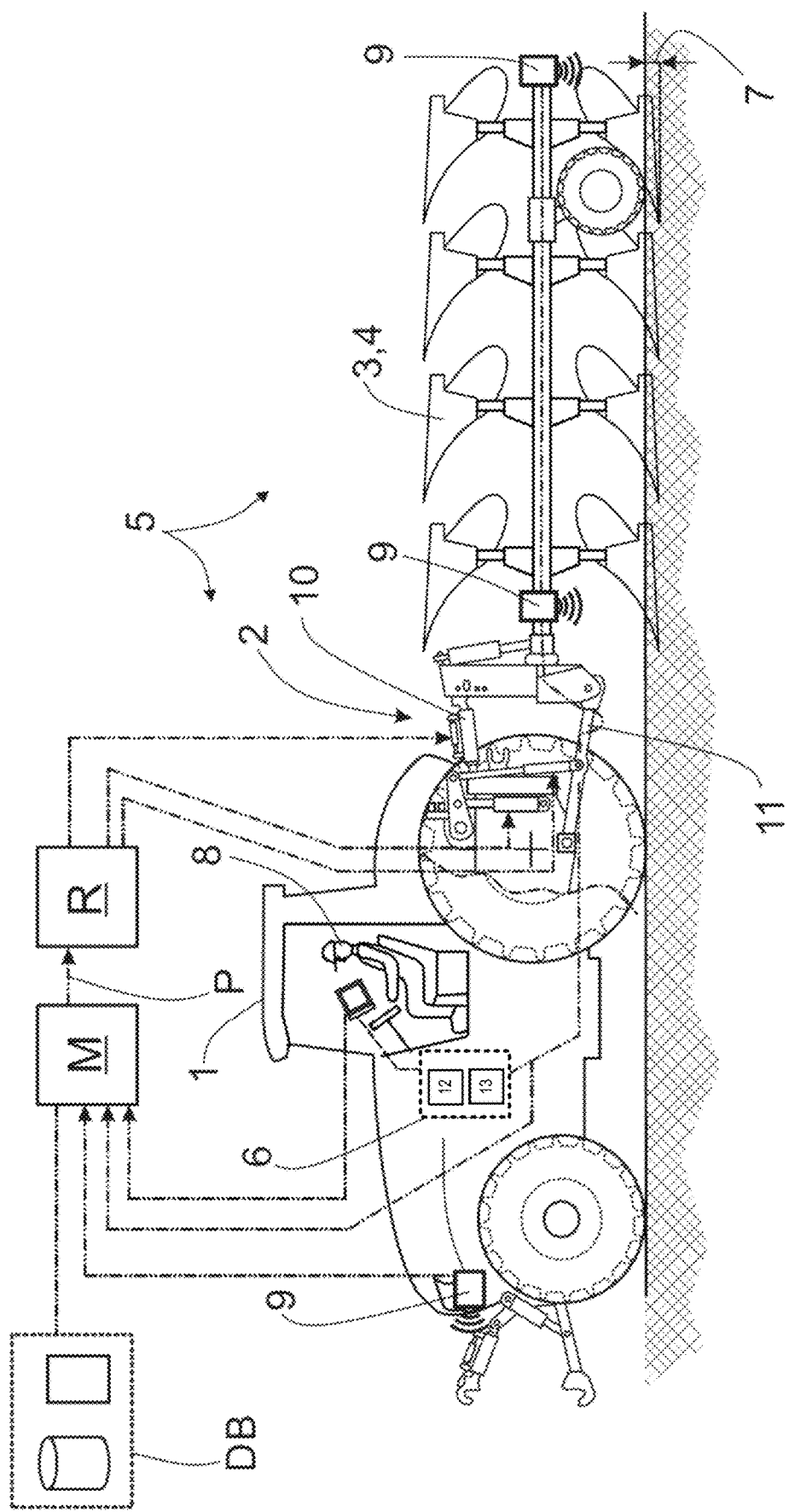
FIG. 1 illustrates an agricultural combination for use in the disclosed method, and FIG. 2 schematically illustrates the dependence between the slip and driving force efficiency.

As discussed in the background, setting the rear power lift generally is performed manually. It may, however, be very difficult for the user to efficiently set the rear power lift. He/she may be unaware of the specific effects of his/her settings. In particular, in the case of slip, the settings may depend on the tire properties and soil properties. Consequently, the settings of the rear power lift typically are made once at the beginning of a work process and not adapted to the current situation. For example, when there are uphill and downhill gradients, the effects of weight overlap with measured traction resistance of the traction regulation may cause the working depth of an agricultural attachment to change.

Further, improper settings of the rear power lift may cause increased fuel consumption, less output per area, increased wear, and a worse work result. Normally, the user therefore manually sets maximum slip based on his/her experience. Depending on the experience and situation, this setting may not be close to the optimum.

Basically, various methods are known for assisting the user; however, these method may still be lacking. In particular, there may be a need for an option to optimize the maximum slip setting. Thus, in one or some embodiments, a method and system for achieving a setting (such as an optimized setting) of the rear power lift is disclosed.

In one or some embodiments, a method for regulating a rear power lift of an agricultural production machine in an agricultural combination is disclosed. The agricultural combination includes the agricultural production machine and an agricultural attachment. The agricultural attachment may be connected to the agricultural production machine via a rear power lift of the agricultural production machine. The agricultural production machine may further have a driver assistance system that regulates one or more machine parameters of the rear power lift, such as by using one or both of a position regulation or a traction regulation on which a slip control is superimposed. More specifically, the driver assistance system may determine a target slip for slip regulation based on any one, any combination, or all of position regulation, traction regulation, or working depth regulation (e.g., optimized for position regulation, and/or traction regulation, and/or working depth regulation) depending on at least one existing soil property and at least one existing tire property. In turn, using the determined target slip, the driver assistance system may regulate the rear power lift (e.g., regulate using the one or more selected one or more machine to the optimized target slip). In this way, the driver assistance system of the agricultural production machine may determine slip depending on the at least one existing soil property and the at least one existing tire property, with the determined slip being used to improve the performance of a given regulation (e.g., any one, any combination, or all of position regulation, traction regulation, or working depth regulation). This is instead of a user setting maximum slip. Rather, the driver assistance system regulates the slip so that a given goal (such as the given optimization goal) is achieved. Example goals, such as example optimization goals, may comprise a maximum fuel efficiency or maximum net traction ratio. This allows an unexperienced user to also achieve high efficiency when setting the slip by leaving the setting to the driver assistance system.

In one or some embodiments, to detect at least one existing soil property, the agricultural combination may have a sensor. For example, the sensor may detect or sense a gradient of the soil and/or a surface property of the soil, such as crumbling of the soil and/or leveling of the soil. Soil properties may be locationally-dependent, may therefore change over a single field and/or may change over time, for example in rain, and overall may have a significant influence on the optimum slip. Some of these influences may be taken into account through sensory acquisition.

In one or some embodiments, other soil properties may be entered or input by a user or saved in a database. For example, the at least one soil property (e.g., the at least one existing soil property) may be saved location-dependently in the database (e.g., the specific soil property(ies) at a specific location may correlated in a table to the specific location). Thus, in one or some embodiments, the at least one existing soil property stored in the database may comprise compaction. Other soil properties are contemplated. In particular, a soil type may not change, or in any case may not change quickly, and may be difficult to detect with a sensor.

In one or some embodiments, the agricultural combination may have a sensor to detect at least one existing tire property. In addition or alternatively, the tire property may be entered by a user or saved in a database. Some tire properties may also be advantageously detected by a sensor, and others not. Example tire properties including any one, any combination, or all of: a weight of part or all of the agricultural production machine (e.g., an axle load and/or an axle ballast); a tire size; a rolling radius of the tire; or a tire pressure.

In one or some embodiments, one or more machine parameters of the rear power lift may be set by the driver assistance system. Merely by way of example, the one or more machine parameters may comprise any one, any combination, or all of: a lifting mechanism position of the upper link and/or of one or the lower links; a lifting mechanism force of one or the lower links; a length of the upper link and/or of one or the lower links and/or of a lifting strut; or an upper link force.

In one or some embodiments, the driver assistance system may determine the target slip to achieve a desired force efficiency, such as a maximum driving force efficiency, or to achieve a desired net traction ration, such as a maximum net traction ratio, or with respect to a combination thereof (e.g., an optimized combination of the driving force efficiency and driving force coefficient). Depending on the specifications of the user or other specifications, greater efficiency may be desired in certain situations, and maximum speed or traction may be desired in others. These specifications may be taken into account in this manner.

In one or some embodiments, it may be desirable to switch off the slip regulation. In this case, the driver assistance system may then use traction regulation, position regulation, or mixed regulation based on soil properties and tire properties. In particular, the driver assistance system may temporarily control the rear power lift based on the at least one existing soil property and the at least one existing tire property using any one, any combination, or all of: position regulation without slip regulation; traction regulation without slip regulation; or a mixed regulation comprising (or consisting of) position regulation and traction regulation without slip regulation (e.g., through which the driver assistance system may determine an optimized mixed factor of the mixed regulation for this purpose).

Thus, in one or some embodiments, the driver assistance system may determine a mixed factor of mixed regulation consisting of position regulation and traction regulation in addition to the target slip. Frequently, the goals of the user are less technical than specifying a mixed factor to be achieved, which may only serve as a means to an end. In particular, based on the user specifications, the driver assistance system may therefore assume control of the work of regulation and specifications for regulation. As such, the driver assistance system may optimally determine a setting of a mixed factor of a mixed regulation consisting of position regulation and traction regulation based on the at least one existing soil property and the at least one existing tire property and/or the target slip. The driver assistance system may further regulate the rear power lift 2 based thereupon. More specifically, the driver assistance system may determine the mixed factor and the target slip (P) to achieve a specification (e.g., a user specification), such as a specification of one or more of a predetermined working depth, a predetermined travel speed, or a predetermined traction.

Since not all the necessary soil properties and tire properties are always available, in one or some embodiments, the driver assistance system may determine a characteristic diagram in a characteristic diagram routine that maps the dependencies between soil, tires and slip, and with the determined characteristic diagram serving as the basis for determining the target slip. This characteristic diagram routine may be executed over many work processes and improve the characteristic diagram piecemeal, may be executed during each work process, or may be executed when necessary.

In one or some embodiments, the agricultural attachment may include a sensor for determining or sensing an absolute working depth, which may be used for working depth regulation. This makes enable direct regulation of one of the most important machine parameters, such as the working depth of the attachment, by using precisely measured data for the working depth, and to take efficiency aspects into account with the slip control superimposed.

The machine parameters of the attachment may also be relevant for a working process. Similar to the working depth regulation, these may be controlled or regulated depending on the target slip, or the target slip may be determined depending on the machine parameters. This may also improve the coordination between slip and actual fieldwork. The situation is such that various machine parameters of the combination may have a different influence on the slip and on the work result. If, due to the optimized target slip, there is not enough leeway available to set all machine parameters as desired, the slip control may partially lift the attachment. Through the disclosed solution, another machine parameter that has an influence on the slip but, for example, has less influence on the work result, may be changed instead. As such, in one or some embodiments, the driver assistance system may further control or regulate machine parameters of the attachment depending on the target slip (P) and/or determine the target slip depending on the machine parameters of the attachment. More specifically, the driver assistance system may control or regulate a cutting width and/or a working depth of a plow depending on the target slip.

If the combination travels up a slope, conventional systems often partially lift up the attachment, especially a plow, to compensate for the increased need for driving force. In one or some embodiments, it is disclosed to take into account the total weight of the combination and a slope to be able to counteract this effect. In this context, the target slip may be increased in order to achieve a more constant working depth on slopes, for example at the expense of driving force efficiency. Thus, in one or some embodiments, the driver assistance system may further determine the target slip depending on a total weight of the agricultural combination and an inclination of the ground and/or of the agricultural combination.

In one or some embodiments, an agricultural combination is claimed. In one or some embodiments, the driver assistance system may determine a target slip for slip regulation (e.g., optimized for position regulation, and/or traction regulation depending on at least one existing soil property and at least one existing tire property), and regulate the rear power lift to the optimized target slip. Reference may be made to all statements regarding the disclosed method.

Referring to the figures, in the embodiment that is depicted, the agricultural production machine 1 is a tractor. Specifically, the agricultural production machine 1 has a rear power lift 2 that is designed as a three-point power lift. An agricultural attachment 3 attached to the rear power lift 2 may be a soil cultivation device such as a plow 4, or a cultivator, or a harrow. Together, the agricultural production machine 1 and agricultural attachment 3 form an agricultural combination 5.

The embodiment shown in the figures relates to a method for regulating a rear power lift 2 of an agricultural production machine 1 in an agricultural combination 5, wherein the agricultural combination 5 has an agricultural production machine 1 and an agricultural attachment 3, and wherein the agricultural attachment 3 is connected to the agricultural production machine 1 via a rear power lift 2 of the agricultural production machine 1.

In one or some embodiments, the agricultural production machine 1 has a driver assistance system 6 that controls machine parameters of the rear power lift 2. The driver assistance system 6 may regulate one or more machine parameters, such as kinematics, of the rear power lift 2 using any one, any combination, or all of: position regulation; traction regulation; or working depth regulation, on which a slip control is superimposed.

In one or some embodiments, the driver assistance system 6 or any other functionality described herein may use computing logic and may comprise any type of computing functionality, such as at least one processor 12 (which may comprise a microprocessor, controller, PLA, or the like) and at least one memory 13. The memory 13 may comprise any type of storage device (e.g., any type of memory). Though the processor 12 and memory 13 are depicted as separate elements, they may be part of a single machine, which includes a microprocessor (or other type of controller) and a memory. Alternatively, processor 12 may rely on memory 13 for all of its memory needs.

The processor 12 and memory 13 are merely one example of a controller assembly configuration. Other types of controller assembly configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

In one or some embodiments, position regulations and traction regulations may be performed. With the working depth regulation, a working depth 7 of the agricultural attachment 3 may be regulated to a predetermined value, and the traction and the position of the rear power lift 2 may adjust themselves accordingly if necessary. This working depth 7 may be location-dependent (e.g., the working depth 7 may vary over the course of the single field during a working process).

In one or some embodiments, the driver assistance system 6 may be part of the agricultural production machine 1, but may however also be arranged externally to the agricultural production machine 1, for example as a cloud control arrangement.

In one or some embodiments, the driver assistance system 6 determines a target slip P for slip regulation optimized for position regulation, and/or traction regulation, and/or working depth regulation depending on at least one existing soil property and at least one existing tire property, and regulates the rear power lift 2 to the optimized target slip P.

FIG. 1 illustrates the division of regulation into two parts. FIG. 1 contains a schematic block diagram of the driver assistance system 6. The first block M contains a calculation rule, for example an expert model or characteristic diagram model for determining the optimized target slip P. This is transferred to the second block R. The second block R contains the position regulation, and/or traction regulation, and/or working depth regulation, on which the slip control is superimposed. Data from a database, such as the soil property and/or tire property, and other data of the agricultural combination 5 may flow into the first block M.

In one or some embodiments, the driver assistance system 6 may basically be set based on a dialog with the involvement of the user 8.

In one or some embodiments, the term "optimized target slip" does not necessarily mean the optimum target slip P. It is enough for optimization to relate to target slip P that is somehow optimum. The optimization target may be specified by the user 8 or otherwise. This is further explained below. As previously mentioned, the optimum target slip P may depend on the soil properties and/or the tire properties. For example, the optimum target slip P may differ significantly in wet soil and in dry soil. In one or some embodiments, optimization may be performed using an expert model. Various series of measurements on the subject of "optimum slip" are known, for example, which may be converted into such an expert model. In this case, the optimized target slip P may comprise a maximum slip. If this is reached or exceeded, the agricultural attachment 3 may be partially raised to reduce the slip again. It is therefore not the case that the target slip P is necessarily set permanently (e.g., the target slip P may vary).

Figure 2:
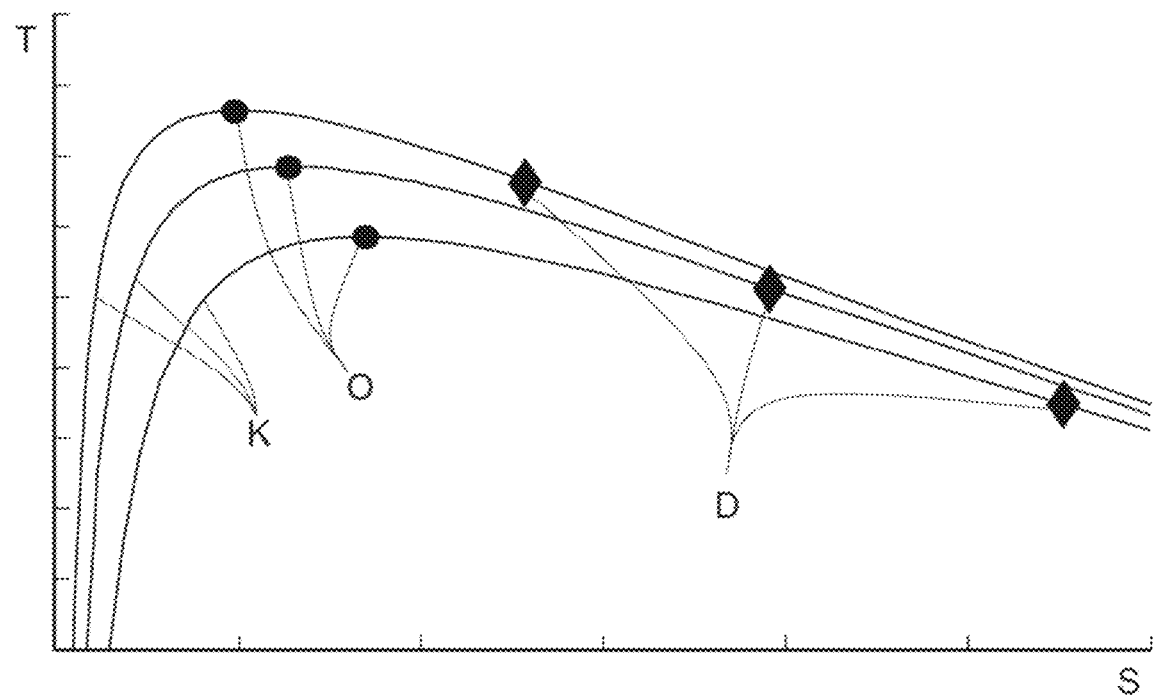

FIG. 2 schematically shows the dependence between a percentage slip S on the abscissa and a driving force efficiency T on the ordinate during field work. The different curves K relate to different soil properties. The maximum of the curves K lies in the range of a percentage slip S of 10% to 20% for usual soil properties. The particular maximum driving force efficiency O is approximately between 50% and 80% and is marked with a circle, while the diamond indicates an optimum slip for a maximum driving force coefficient D. The graph is only to be understood schematically and for illustration purposes.

Furthermore in this case, the agricultural combination 5 has a sensor 9 for detecting or sensing at least one of the existing soil properties, the sensor 9 may detect one or more aspects of the soil, such as any one or both of: a gradient of the soil; or a surface property of the soil (e.g., crumbling of the soil and/or leveling of the soil).

As FIG. 1 illustrates, the sensor 9 may be seated or positioned in a region upstream from soil cultivation by the agricultural attachment 3. In particular, the sensor 9 may be seated or positioned on the agricultural attachment 1. In one or some embodiments, the sensor 9 may be based on electromagnetic waves or acoustic waves. The sensor 9 may be a radar sensor, or a lidar sensor, or an optical sensor, or an ultrasonic sensor. Furthermore, the sensor 9 may also be an inclination sensor which detects an inclination of the agricultural production machine 1 and may infer therefrom that it is moving uphill or downhill. The slope as a soil property may be particularly relevant in the present case since the slope may be detected with very little effort and simultaneously may have great influence on the regulation of the rear power lift 2.

In one or some embodiments, at least one of the soil properties is entered by a user 8 and/or is saved in a database DB. The at least one existing soil property may be saved location-dependent in the database DB (e.g., the at least one existing soil property may be correlated in a database DB to various locations so that responsive to determining a current location, the database DB may be accessed in order to determine the at least one existing soil property correlated thereto). In one or some embodiments, the at least one existing soil property in the database DB comprises compaction.

Thus, regardless of its origin, in one or some embodiments, the soil property may be location dependent. This may be inherent in a sensor 9, but it is also preferred, however, for a soil property that is entered or originates from a database DB. For example, the soil property may include lane data (e.g., driving lane data) that allows conclusions to be drawn about compaction in the lanes (e.g., in the driving lanes). In one or some embodiments, the database DB may be part of the driver assistance system 6, or the data may be transmitted to the driver assistance system 6.

In one or some embodiments, the term "location-dependent" is to be understood as meaning that the soil properties change over a field and correspondingly also have a local resolution on the individual field.

Additionally or alternatively, the agricultural combination 5 has a sensor 9 for detecting at least one existing tire property, and/or at least one of the at least one tire properties is entered by the user 8 and/or is saved in the database DB. In this respect, the statements regarding the soil properties apply accordingly.

In one or some embodiments, the at least one tire property comprises a weight of the agricultural production machine 1, such as an axle load, and/or an axle ballast, and/or a tire size, and/or a rolling radius of the tire, and/or a tire pressure.

All of the above properties may be used individually or in any combination. The tire properties may each relate to one or more tires. The overall result is that the slip may depend on the soil, a weight on the tire, tire materials, and the like. Therefore, these properties may be considered to determine the target slip P.

In the context of the particular controls, the driver assistance system 6 on the rear power lift 2 may regulate, in terms of selecting one or more machine parameters, a lifting mechanism position of the upper link 10, and/or of one or the lower links 11, and/or a lifting mechanism force of one or the lower links 11, and/or a length of the upper link 10, and/or of one or the lower links 11, and/or of a lifting strut, and/or an upper link 10 force. It is noted that the driver assistance system 6 is broadly defined here. The driver assistance system 6 may also have a rear force regulator which as such may be an independent module and which may be represented by the second block R in FIG. 1.

Furthermore, in one or some embodiments, the driver assistance system 6 may determine the target slip P to achieve a maximum driving force efficiency or a maximum driving force coefficient, or with regard to an optimized combination of the driving force efficiency and driving force coefficient.

In one or some embodiments, the optimization with regard to the driving force efficiency and the driving force coefficient may be dependent on a user specification. This user specification may be a target specification. The target specification may be a minimization of consumption and/or a maximization of a speed of the execution of the working process, and/or a minimization of the costs of the process, and/or a maximization of the quality of the work. In one or some embodiments, the user 8 may visually set the weighting of the target specifications on the agricultural production machine 1.

In one or some embodiments, the driver assistance system 6 may temporarily control the rear power lift 2 on the basis of the at least one existing soil property and the at least one existing tire property using a position regulation without slip regulation, and/or a traction regulation without slip regulation, and/or a mixed regulation consisting of position regulation and traction regulation without slip regulation, and may determine a mixed factor of mixed regulation for this purposes (e.g., an optimized mixed factor of the mixed regulation for this purpose). In addition or alternatively, the driver assistance system 6 may determine the optimized mixed factor for periods in which the target slip P is not achieved and the slip control therefore does not take effect.

This may take into account that slip control may not be always possible or useful. The driver assistance system 6 may therefore fall back on known regulations. In particular, the driver assistance system 6 may recognize a lack of information on the soil properties and tire properties and may deduce therefrom that an optimized target slip P cannot be determined with sufficient certainty.

Furthermore, in one or some embodiments, the driver assistance system 6 may determine, such as optimally determine, a setting of a mixed factor of a mixed regulation consisting of position regulation and traction regulation based on the at least one existing soil property and the at least one existing tire property and/or the target slip, and may regulate the rear power lift 2 based thereupon.

In addition to the slip control, the position regulation or the traction regulation or, more specifically, their mixture may therefore also be optimized by the driver assistance system 6. This may be done to achieve or comply with a user specification. The user 8 may, for example, therefore make the aforementioned target specifications or set a desired working depth 7, and the driver assistance system 6 may assume control of the rear power lift 2 to meet one or both of the target specifications or desired working depth 7. The driver assistance system 6 may then, by default, optimize the slip with regard to an efficiency, provided that there is still leeway.

In one or some embodiments, the driver assistance system 6 may determine one or both of the mixed factor or the target slip P to achieve a specification, such as a user specification. In one or some embodiments, the specification may be a predetermined working depth 7, a predetermined travel speed, or a predetermined traction. One procedure in this case is that the user 8 may specify a working depth 7, and one or both of the traction or a travel speed of the agricultural combination 5 follow from the target slip P since the agricultural production machine usually operates at or near full load during soil cultivation.

In one or some embodiments, the driver assistance system 6 may vary settings of the rear power lift 2 in a characteristic diagram routine for given soil properties and tire properties in order to determine dependencies between the soil properties and tire properties and the slip, such as in the form of a characteristic diagram (e.g., in effect generating a new characteristic diagram or modifying a previously existing characteristic diagram), and then may determine the target slip P based thereupon (e.g., based on the characteristic diagram).

This makes it possible to determine influences of unknown tire properties and soil properties or unknown influences on the slip. The characteristic diagram routine may be executed over several work processes and therefore may lead to optimization bit by bit, or be performed at the start of each work process, if necessary.

In one or some embodiments, characteristic diagrams are equations or combinations of equations and/or inequations, or dependencies depicted in some other way between settings of machine parameters, measured data, influential factors, etc.

In one or some embodiments, the agricultural attachment 3 has a sensor 9 for determining an absolute working depth 7 for working depth regulation.

An absolute working depth may be measured using the sensor. In one or some embodiments, the term "absolute" is not necessarily to be understood as a precise measurement, but generally as a measurement relative to the soil. It may be conceivable for the measurement to be relative to a component whose height relative to the soil is known; in one or some embodiments, however, the absolute working depth is measured directly relative to the soil.

The sensor may be designed as a sensor assembly. In one or some embodiments, the sensor assembly may have at least one sensor holder, wherein the sensor may always be reversibly mounted using the at least one sensor holder at a mounting position on different attachments.

In one or some embodiments, the sensor is mounted using the sensor holder at the mounting position such that the mounting is nondestructively reversible. In particular, the sensor holder may be installed on the attachment during manufacture of the attachment. Alternatively, the sensor holder may be installed on the attachment after manufacture, such as on site on the field using simple tools, or entirely without tools.

In one or some embodiments, the sensor may be used with different attachments and may therefore be modular. An advantageous use of this modular sensor system relates to the measurement of the working depth of an agricultural attachment that does not have its own electronics. As will be seen below, the sensor assembly may therefore be independent from the attachment. Alternatively, the sensor does not communicate with the attachment. Instead, in one or some embodiments, the sensor is integrated in electronics of the attachment or communicates therewith. Also in the case of attachments with electronics, it may however be provided that the sensor does not communicate directly with the attachment. In one or some embodiments, the sensor assembly may be used with attachments with and without electronics. Alternatively, it may even be provided that the working height is determined completely independent of the agricultural attachment.

In one or some embodiments, the sensor holder may be mounted separate from the sensor on the different attachments (e.g., a first sensor holder is mounted at a first mounting position on a first attachment and a second sensor holder is mounted at a second mounting position on a second attachment). The sensor may then reversibly mountable on a respective sensor holder (e.g., in the first sensor holder at the first mounting position or in the second sensor holder at the second mounting position). In one or some embodiments, the sensor holder is a relatively inexpensive mass-produced component, while the sensor itself is relatively expensive. The disclosed method allows the expensive sensor to be reused.

For reasons of convenience, however, it may be provided that the sensor holder remains on the attachment. This allows the sensor holder to be stable and more complex to mount, while mounting the sensor in the sensor holder itself may be relatively simple. This also allows the same mounting position to be reused when the sensor is attached again.

To determine the working height, a reference height may be saved that indicates the working height at a known distance of the sensor from the ground. The working height may then result from the difference.

In one or some embodiments, the driver assistance system 6 may further control or regulate one or more machine parameters of the agricultural attachment 3 depending on the target slip P and/or determines the target slip P depending on the machine parameters. In particular, in one or some embodiments, the driver assistance system 6 may control or regulate a cutting width and/or a working depth 7 of a plow 4 depending on the target slip P.

In one or some embodiments, the driver assistance system 6 further determines the target slip P depending on a total weight of the agricultural combination 5 and an inclination of the ground and/or of the agricultural combination 5. For this purpose, the agricultural combination 5 may have an inclination sensor for determining the inclination of the agricultural combination 5. Alternatively, the inclination of the ground may be taken from a database DB (e.g., inclination in the field may be corrected to location in a look-up table). The joint weight of the agricultural production machine 1 and the agricultural attachment 3 may significantly determine the behavior of the agricultural combination 5 on slopes.

In one or some embodiments, the driver assistance system 6 may determine the weight of the agricultural combination 5 from an actual slip, such as by successively adjusting the target slip. If the driver assistance system 6 sets a target slip P on a slope, the attachment may be lifted to a specific working depth 7 by the downstream regulation. From this, conclusions may be drawn about the weight. In addition or alternatively, the driver assistance system 6 may use another actual variable, such as any one, any combination, or all of an actual position, an actual traction, or an actual working depth to determine the weight. In this case, the weight does not have to be determined as such; rather, in one or some embodiments, it may be enough to adjust the target slip P depending on a weight-dependent variable determined in this way, or based on a calculation specification that indirectly takes the weight into account. In one or some embodiments, the target slip may thus be adjusted on a slope depending on the weight.

Alternatively, or in addition, the weight may be entered by the user.

In one or some embodiments, an agricultural combination 5, wherein the agricultural combination 5 comprises an agricultural working machine 1 and an agricultural attachment 3, wherein the agricultural attachment 3 is connected to the agricultural production machine 1 via a rear power lift 2 of the agricultural production machine 1, wherein the agricultural production machine 1 has a driver assistance system 6 which regulates machine parameters of the rear power lift 2, wherein the driver assistance system 6 regulates the machine parameters of the rear power lift 2 using a position regulation and/or a traction regulation on which a slip control is superimposed.

In one or some embodiments, the driver assistance system 6 determines a target slip P for slip regulation optimized for position regulation, and/or traction regulation depending on at least one existing soil property and at least one existing tire property, and regulates the rear power lift 2 to the optimized target slip P. Reference may be made to all statements regarding the disclosed method.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural production machine
2 Rear power lift
3 Agricultural attachment
4 Plow
5 Agricultural combination
6 Driver assistance system
7 Working depth
8 User
9 Sensor
10 Upper link
11 Lower link
12 Processor
13 Memory
P Target slip
M First block
R Second block
DB Database
S Percent slip
T Driving force efficiency
K Curve
O Maximum driving force efficiency
D Maximum driving force coefficient

The invention claimed is:

1. A method for regulating a rear power lift of an agricultural production machine in an agricultural combination, wherein the agricultural combination has an agricultural production machine and an agricultural attachment, wherein the agricultural attachment is connected to the agricultural production machine via a rear power lift of the agricultural production machine, wherein the agricultural production machine has a driver assistance system which regulates one or more machine parameters of the rear power lift, wherein the driver assistance system regulates the one or more machine parameters of the rear power lift using one or both of a position regulation or a traction regulation on which a slip control is superimposed, the method comprising:

accessing a characteristic diagram that includes dependencies between soil properties and tire properties and the slip;

determining, by the driver assistance system using the characteristic diagram that includes dependencies between soil properties and tire properties and the slip, a target slip for slip regulation optimized for one or more of the position regulation, the traction regulation, or working depth regulation depending on at least one existing soil property and at least one existing tire property; and regulating the rear power lift to the target slip.

2. The method according to claim 1, wherein the agricultural combination has a sensor for detecting the at least one existing soil property; and wherein the sensor detects one or both of a gradient of soil or a surface property of the soil.

3. The method of claim 1, wherein the at least one existing soil property is one or both of: entered by a user or saved in a database.

4. The method of claim 3, wherein the at least one existing soil property is saved location-dependent in the database.

5. The method of claim 3, wherein the at least one existing soil property comprises compaction.

6. The method of claim 1, wherein the at least one existing tire property is one or more of: detected by a sensor on the agricultural combination; entered by a user; or saved in a database.

7. The method of claim 6, wherein the at least one existing tire property comprises a weight of the agricultural production machine.

8. The method of claim 6, wherein the at least one existing tire property comprises one or more of: an axle load; an axle ballast; a tire size; a rolling radius of a tire; or a tire pressure.

9. The method of claim 1, wherein the driver assistance system on the rear power lift regulates, by controlling one or more machine parameters, one or more of:

a lifting mechanism position of one or both of an upper link or at least one lower link;

a lifting mechanism force of the at least one lower link;

a length of one or more of the upper link, the at least one lower link, or a lifting strut; or an upper link force.

10. The method of claim 1, wherein the driver assistance system determines the target slip to achieve a maximum driving force efficiency or a maximum driving force coefficient, or with regard to an optimized combination of driving force efficiency and driving force coefficient.

11. A method of claim 1, for regulating a rear power lift of an agricultural production machine in an agricultural combination, wherein the agricultural combination has an agricultural production machine and an agricultural attachment, wherein the agricultural attachment is connected to the agricultural production machine via a rear power lift of the agricultural production machine, wherein the agricultural production machine has a driver assistance system which regulates one or more machine parameters of the rear power lift, wherein the driver assistance system regulates the one or more machine parameters of the rear power lift using one or both of a position regulation or a traction regulation on which a slip control is superimposed, the method comprising:

determining, by the driver assistance system, a target slip for slip regulation optimized for one or more of the position regulation, the traction regulation, or working depth regulation depending on at least one existing soil property and at least one existing tire property; and regulating the rear power lift to the target slip;

wherein the driver assistance system temporarily controls the rear power lift based on the at least one existing soil property and the at least one existing tire property using one or more of:

position regulation without slip regulation;

traction regulation without slip regulation; or mixed regulation consisting of position regulation and traction regulation without slip regulation; and wherein the driver assistance system determines an optimized mixed factor of the mixed regulation.

12. The method of claim 1, wherein the driver assistance system optimally determines a setting of a mixed factor of a mixed regulation comprising position regulation and traction regulation based on one or more of the at least one existing soil property, the at least one existing tire property, or the target slip; and wherein the driver assistance system determines the mixed factor and the target slip to achieve a specification of at least one of: a predetermined working depth; a predetermined travel speed; or a predetermined traction.

13. The method of claim 1, wherein the driver assistance system:

varies, in a characteristic diagram routine, settings of the rear power lift for given soil properties and tire properties in order to determine the dependencies between the soil properties and the tire properties and the slip for generating or modifying the characteristic diagram; and determines, using the characteristic diagram, the target slip.

14. The method of claim 1, wherein the agricultural attachment includes a sensor for sensing or measuring an absolute working depth for working depth regulation.

15. The method of claim 1, wherein the driver assistance system further performs one or both of:

controls or regulates one or both of a cutting width or a working depth of a plow depending on the target slip; or determines the target slip depending on the one or more machine parameters.

16. The method of claim 1, wherein the driver assistance system further determines the target slip depending on a total weight of the agricultural combination and on one or both of an inclination of ground or of the agricultural combination.

17. The method of claim 1, wherein the driver assistance system controls or regulates one or both a cutting width or a working depth of a plow depending on the target slip.

18. An agricultural combination comprising:

an agricultural production machine comprising a rear power lift and a driver assistance system; and an agricultural attachment;

wherein the agricultural attachment is configured for connecting to the agricultural production machine via the rear power lift of the agricultural production machine;

wherein the driver assistance system is configured to:

access a characteristic diagram that includes dependencies between soil properties and tire properties and slip;

determine, using the characteristic diagram that includes dependencies between soil properties and tire properties and the slip, a target slip for slip regulation optimized for one or both of position regulation or traction regulation depending on at least one existing soil property and at least one existing tire property; and regulate, based on the target slip, one or more machine parameters of the rear power lift using one or both of position regulation or traction regulation on which a slip control is superimposed.

19. The agricultural combination of claim 18, wherein the driver assistance system is configured to determine the target slip optimized for each of the position regulation, the traction regulation, and working depth regulation depending on the at least one existing soil property and the at least one existing tire property.

20. The method of claim 1, further comprising modifying the characteristic diagram; and wherein determining the target slip using the characteristic diagram is based on both the at least one existing soil property and the at least one existing tire property.

* * * * *